July 18, 1967  J. T. HUTTON ETAL  3,331,306
CONDITIONING APPARATUS
Filed May 7, 1965  2 Sheets-Sheet 2
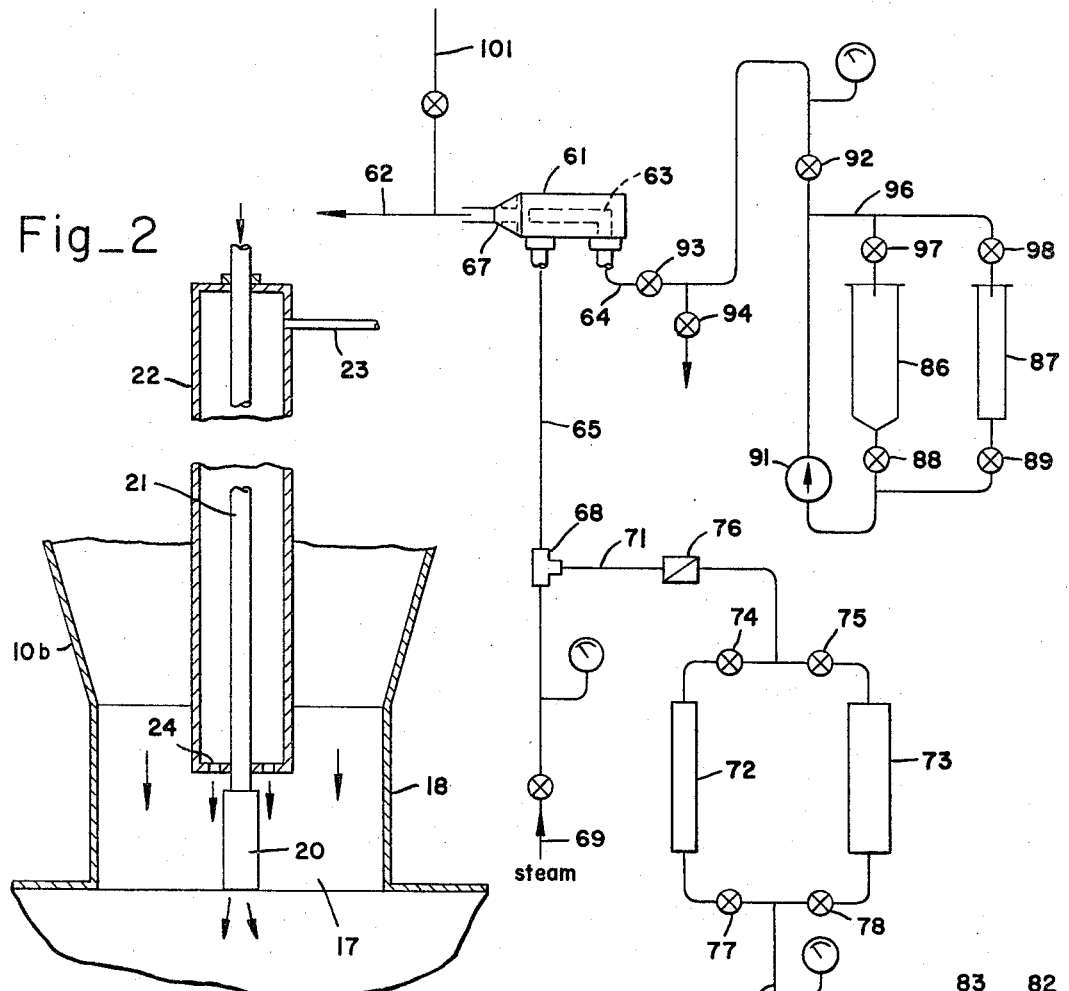
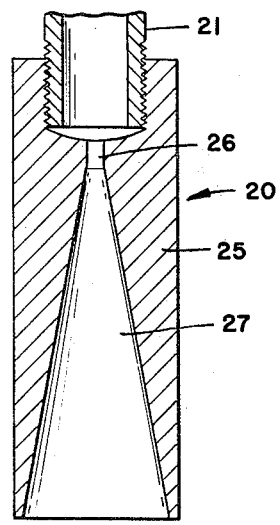
INVENTORS
JERRY T. HUTTON
LOUIS J. NAVA
BY GAYLORD M. PALMER
ATTORNEYS

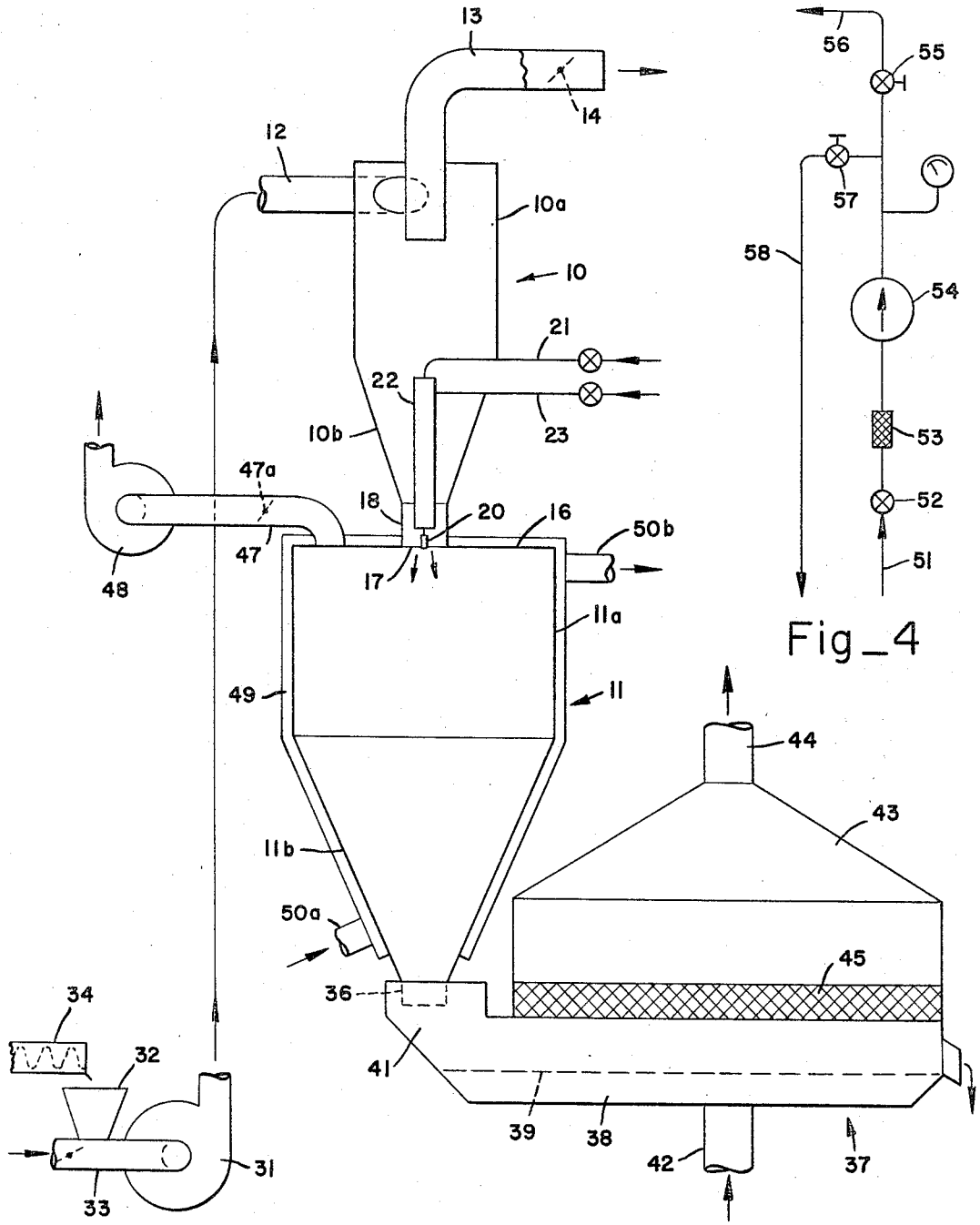

United States Patent Office

3,331,306
Patented July 18, 1967

3,331,306
CONDITIONING APPARATUS
Jerry T. Hutton, Novato, Louis J. Nava, Redwood City, and Gaylord M. Palmer, Petaluma, Calif., assignors to Foremost Dairies, Inc., San Francisco, Calif., a corporation of New York
Filed May 7, 1965, Ser. No. 454,065
4 Claims. (Cl. 99—234)

This invention relates generally to apparatus for the manufacture of dry products in the form of discrete aggregates.

Many products that have been produced in powdered form are known to be difficult to disperse in cold water, due mainly to poor wettability and to the tendency to form sticky lumps. Also, a common property of many such products is that they do not readily pour, and, therefore, cannot be marketed in containers of the pour spout type. Of recent years, a number of products have been made in the form of discrete aggregates, and are commonly referred to as being in the "instant" form. Particular reference can be made to dry skim milk, which, when in the form of discrete aggregates, differs from normal spray dried milk in that it has good wettability and can be readily dispersed in cold water by simple stirring to form a stable reconstituted milk. Also, it has a bulk density less than the spray dried powder and it can be readily poured from a container package. Additional products that have been instantized or made in the form of aggregates include fat-containing milk (e.g., low fat or whole milk), flavored milk (i.e., chocolate flavored milk), synthetic milks, gelatine, pectin, starch, lactose, onion and garlic powders, and coffee.

One type of apparatus which has been used for various instantizing or aggregating operations is disclosed in Peebles 3,085,492. It consists of a treatment chamber having its upper portion connected to a powder supply conduit. Powder is fed to the intake side of a blower which connects with the supply conduit, whereby the powder is conveyed pneumatically and discharged downwardly into the treatment chamber. Means is provided for maintaining a moist atmosphere in the upper portion of the chamber whereby moisture is imparted to the powder particles to make them sticky. This is generally one or more nozzles through which wet steam, with or without entrained water droplets, is discharged. The powder particles are moistened within the treatment chamber and caused to be brought into random contacts to form aggregates. These aggregates then fall through the lower end of the chamber to be received by a conveyor which feeds the moist material to driers for removing excess moisture.

While the instantizing apparatus as shown in Peebles Patent 3,085,492 gives good results with a variety of materials, it has certain limitations and disadvantages. For example, it is somewhat critical to control, and therefore it is difficult to maintain desired optimum instantizing conditions. In addition, the size of the equipment for a given capacity is relatively large, thus increasing equipment costs and increasing space requirements. Also, such apparatus is not sufficiently flexible in its adaptability to a wide variety of powdered materials.

In general, it is an object of the present invention to provide improved apparatus for converting dry powdered material into the form of discrete aggregates.

Another object of the invention is to provide apparatus of the above character having novel means for effecting good control whereby optimum operating conditions can be maintained.

Another object of the invention is to provide apparatus of the above character having improved means for effective distribution of dry powder particles into the treatment chamber.

Another object is to provide apparatus of the above character which has relatively high capacity for its size.

Additional objects and features of the invention will appear from the following description in which the preferred embodiments have been set forth in detail in conjunction with the accompanying drawing.

Referring to the drawing:

FIGURE 1 is a side elevational view schematically illustrating apparatus in accordance with the present invention;

FIGURE 2 is an enlarged detail illustrating the location of the fluid nozzle and parts associated with the same;

FIGURE 3 is an enlarged detail showing a suitable fluid nozzle;

FIGURE 4 is a schematic diagram illustrating one type of equipment which can be used for introducing water into the apparatus; and FIGURE 5 is a diagram schematically illustrating another form of apparatus which can be used for introducing various fluid treatment mediums into the apparatus of FIGURE 1.

The apparatus shown in FIGURE 1 consists of a cyclone chamber 10, together with a treatment chamber 11. The cyclone chamber can correspond generally to that of a conventional pneumatic cyclone, and is shown consisting of the upper cylindrical portion 10a and the lower conical shaped portion 10b. A feed supply conduit 12 connects tangentially with the upper portion of the chamber, and an exhaust conduit 13 communicates with the central region of the cyclone chamber and serves to remove air from which powder has been centrifugally separated. Conduit 13 is provided with a control valve or damper 14.

The treatment chamber 11 can conveniently be made with an upper cylindrical shaped portion 11a, together with a lower conical shaped portion 11b. The top wall 16 has an opening 17 that is in direct communication with the lower end of the cyclone through the short coupling conduit 18. It will be noted that the cyclone and treatment chambers 10 and 11, and also the opening 17, are in axial alignment.

The means employed for introducing a fluid conditioning medium is shown particularly in FIGURE 2. It consists of a spray nozzle 20 attached to the lower end of the fluid supply pipe 21. The portion of the pipe 21 extending immediately above the nozzle is enclosed within the jacket 22. One portion of this jacket is in communication with air supply pipe 23, and the lower end of the jacket is provided with openings 24 from which air is discharged into a region generally surrounding the nozzle 20. As shown particularly in FIGURE 1, both pipes 21 and 23 extend to the exterior of the cyclone chamber 10.

During operation of the apparatus, the jacket 22 serves the purpose of preventing contact between the solid material being treated and the pipe 21 which, under certain operating conditions might cause accumulation of solid material. Also, the downwardly directed air jets discharging from apertures 24 into the region surrounding the nozzle 20 tend to prevent back swirl and accumulation of solid material on the nozzle. The jacket itself remains relatively cool, irrespective of the temperature of pipe 21.

A desirable type of nozzle is shown in FIGURE 3. It consists of a body 25 which is bored and threaded for attachment to the pipe 21. It has an orifice 26 and a divergent passage 27 extending from the orifice. The divergent passage 27 is circular in section. A nozzle of this type serves to direct a divergent conical shaped spray into the treatment chamber. It will be noted that the lower end of the nozzle 25 is substantially at the upper end of the treatment chamber, and the nozzle is aligned with the central vertical axis of the chamber. The pipe 21, together with the jacket 22, extends upwardly into the conical portion 10b of the cyclone chamber 10.

Various conventional equipment can be used for supplying dry powder particles together with an airstream to the conduit 12. As illustrated schematically in FIGURE 1, the conduit 12 may connect to the discharge side of the blower 31. A powder hopper 32 communicates with the conduit 33 which, in turn, connects with the inlet side of the blower. A powder feed means 34, such as one of the feed scerw type, serves to deliver powder at a desired regulated rate to the hopper 32.

The treated material in the form of discrete aggregates drops by gravity through the lower end 36 of the treatment chamber 11. In FIGURE 1, the discharge opening 36 is shown delivering the material directly to the drier 37. This arrangement has been found practical for a number of materials, including milk products. The drier of the shaker type illustrated consists of a main body 38 which has an inlet end 41 coupled directly to the lower end of the treatment chamber. Warm dry air is introduced below the screen through conduit 42. Air is removed from the space over the screen by the hood 43 and conduit 44. The flexible cloth walls 45 couple the lower end of the hood to the upper side of the body 38. It will be understood that two or more stages of such drying units can be employed if desired. If the material being processed requires a retention period between discharge from chamber 11 and introduction into the drier, then an intervening conveyer can be employed as disclosed in Peebles 3,085,492.

In the treatment of certain materials it is desirable to provide an approximate air seal between opening 36 and the drier inlet end 41. In other instances it is desirable to provide an opening to permit some atmospheric air to be drawn in at this point. The upper part of chamber 11 can be connected by conduit 47 with a suction fan 48. By adjusting damper 47a, conduit 47 may be closed, or may be opened an amount sufficient to draw cool atmospheric air into opening 36, thus causing the downwardly falling aggregates to be enveloped in upwardly moving tempered air.

It is desirable to maintain the walls of chamber 11 at a temperature corresponding generally to the mean temperature of the atmosphere within the same. Thus these walls may be covered with heat insulation, or they may be provided with a jacket 49 connected with the hot air supply conduit 50a and the discharge conduit 50b. With this arrangement, warm air can be circulated through the jacket to maintain the walls of the chamber 11 at a desired temperature level.

Operation of the apparatus described above is as follows: A stream of air, together with entrained dry powder particles, is supplied through the conduit 12 and delivered tangentially into the cyclone chamber 10. Swirling movement within the cyclone about its central axis causes some centrifugal separation of powder particles from the airstream, with some of the air being discharged through the exhaust conduit 13, depending upon the setting of the damper valve 14. Powder separating out by virtue of the swirling movement within the cyclone chamber moves downwardly along the conical walls 10b and continuously passes downwardly through the conduit section 18 and opening 17 into the upper part of the treatment chamber 11. In addition to this downward movement of the powder, some small amount of air may pass downwardly from the cyclone chamber into the treatment chamber, the amount depending upon the setting of the damper valve 14 and the pressure conditions in the region of the opening 17. Within the upper portion of the treatment chamber 11, the powder tends to drop downwardly as a powder cloud, and is immediately involved in the spray issuing from the nozzle 20. The air passing through opening 17 retains a small amount of rotary velocity, and this aids in spreading the material as it moves downwardly into the chamber. The fluid medium supplied to the nozzle 20 through pipe 21 may, in a typical instance, be wet steam, together with water droplets. A moistening zone is thus created in the treatment chamber below the nozzle 20, within which a predetermined amount of moisture is imparted to the surfaces of the powder particles. This conditions the powder particles whereby their surfaces become sticky. Movements of the powder in the treatment chamber also serve to bring the moist sticky powder particles into random contacts, thus causing them to adhere together in the form of moist aggregates. The aggregates progress downwardly within the treatment chamber and eventually drop by gravity through the lower opening 36.

More specifically, with respect to powder movement within the treatment chamber, it may be explained that the powder moving downwardly about the relatively high velocity spray becomes recurrently involved or intermingled with the spray material with the result that a rolling or boiling movement is imparted to the powder and the medium in which it is entrained. In other words, a powder particle tends recurrently to be drawn toward the spray, to be commingled with the spray and thereby caused to move downwardly with the spray at accelerated velocity, then moved radially away from the direct path of the spray, and thereafter drawn back toward the spray. This cyclic rolling or boiling action takes place in the entire space surrounding the spray. It serves effectively to condition the surfaces of the particles, and it brings the particles into random contacts to form the desired aggregates. It makes possible effective conditioning and optimum retention within a relatively small treatment chamber.

In the arrangement illustrated in FIGURE 1, the discrete aggregates are treated in the drier 37 for the removal of excess moisture. In normal practice, the cyclone chamber 10 operates at a slight positive pressure, and this is likewise true of the main portion of the treatment chamber 11. The flow of air through conduit 42 and removal through conduit 44 can be so adjusted as to produce a slight negative pressure in the inlet end 41.

The apparatus described above has a number of desirable characteristics. Particularly, the use of the cyclone chamber 10 greatly facilitates and uniform feed and distribution of powdered material into the upper portion of the treatment chamber. By the use of the cyclone, the dry powdered material is distributed evenly and at a uniform rate, thus ensuring relatively uniform and effective application of the conditioning medium. The damper valve 14, together with the cyclone chamber, make it possible to adjust and thus predetermine the amount of air being delivered into the upper portion of the treatment chamber from the cyclone chamber for a given flow rate of air through the conduit 12. In other words, when the damper valve 14 is opened a greater amount, a larger amount of air is removed through the exhaust 13, thus leaving a lesser or negligible amount of air for flow through the opening 17 into the treatment chamber. Conversely, when the damper valve 14 is adjusted toward closed position, it reduces the amount of air exhausted through conduit 13, and thereby increases the flow of air through opening 17. Thus, it is possible by the control of damper valve 14 to produce optimum flow conditions to obtain optimum treatment of the product within the treatment chamber. In general, it is desirable to maintain the amount of air passing downwardly through opening 17 at a minimum and, therefore, in most instances the adjustment of damper valve 14 provides for discharge of substantially all or a major portion of the conveying air through conduit 13. When an adjustment has been made to obtain optimum conditions, the appartus tends to continue operation without deviating from the optimum.

This is attributed to the fact that should the flow through conduit 12 vary temporarily for some reason, such variations or surges are minimized by the cyclone chamber serving as a surge-absorbing space, and because of the continual flow of substantially all or the major portion of the air through the exhaust conduit 13.

Where the apparatus is used for instantizing milk solids, such as non-fat milk solids, the powder can be that produced by conventional spray drying, and the fluid delivered through pipe 21 to the nozzle 20 can be wet steam, together with some water droplets. The same applies to fat-containing milk powders, such as milk powder containing 7 percent butterfat or whole milk powder. A similar conditioning medium can be used for such products as flavored milk solids, gelatine, pectin, starch, lactose, onion and garlic powders, and coffee. Synthetic milk powders, such as one produced by spray drying a mixture of corn syrup solids (56 percent), hydrogenated vegetable fat (37.5 percent), sodium caseinate (5.0 percent) diapotassium phosphate (1.0 percent), and an emulsifier (0.5 percent), can be instantized without the use of steam and with atomized water alone being supplied to the nozzle.

FIGURE 4 illustrates schematically a simple arrangement for introducing water at a regulated rate to a suitable atomizing nozzle. Thus, the water supply pipe 51 connects through valve 52 and strainer 53 with the high pressure pump 54. The discharge side of this pump connects through adjustable needle valve 55 with the pipe 56 leading to the pipe 21 of the equipment shown in FIGURE 1. The discharge side of pump 54 is shown connected through needle-valve 57, with the bypass pipe 58. With this arrangement, a desired pressure is maintained on the spray nozzle, as for example, a pressure of the order of 1,000 to 4,000 p.s.i. With the pump 54 operating at a certain capacity, the desired pressure and rate of flow to the nozzle can be controlled by the bypass needle valve 57, in conjunction with control of the valve 55.

FIGURE 5 shows an arrangement for preparing a fluid conditioning medium, where the medium includes steam together with water. The apparatus in this instance includes a mixing device 61 having its tapered discharge end connected by line 62 to line 21 of FIGURE 1. The device 61 includes a hollow body having an inner tube 63 which connects with line 64. Also, the body has a side inlet connected to line 65. The tapered discharge end includes the swirl fins or vanes 67. Line 65 connects to the discharge side of the steam-water mixer 68, the latter being connected with the steam line 69 and with the water supply line 71. To provide means for metering the flow of water, a pair of metering devices 72 and 73 are provided having corresponding ends connected through valves 74 and 75 with line 71 through the check valve 76. The other ends of devices 72 and 73 are connected through valves 77 and 78, with the water line 79, which connects to the discharge side of the centrifugal pump 81. A water supply line 82 supplies water through a strainer 83 to the supply tank 84 and this tank connects with the inlet side of pump 81. It is convenient to attach suitable pressure gauges to the lines 69 and 79, as illustrated. Devices 72 and 73 can be of the rotameter type, and have different capacities.

Line 64 serves to introduce another fluid medium into the mixing device 61 to be admixed with the steam-water mixture. When milk solids of various types are instantized, this medium may be commercial liquid lecithin (see Patent 3,164,473 and copending application Serial No. 266,595, filed Mar. 20, 1963). The arrangement illustrated in FIGURE 5 for the introduction of a measured amount of lecithin or like material consists of a tank 86 in which the liquid lecithin is stored, together with a measuring cylinder 87 which is graduated. The lower ends of tank 86 and measuring cylinder 87 are connected through valves 88 and 89 with the inlet side of the adjustable capacity positive displacement pump 91. The discharge side of pump 91 is connected with line 64 through the valves 92 and 93. Valve controlled line 94 can be provided as a convenient drain. A bypass line 96 also connects with the discharge side of pump 91 and serves to supply liquid to either tank 86 or cylinder 87 through the valves 97 and 98.

Operation of the apparatus shown in FIGURE 5 is as follows: Steam at constant pressure is supplied to the line 69. Pump 81 draws from a supply of water in the tank 84, and this water is shunted through either one of flow metering devices 72 or 73, depending upon the flow rate desired. From one or the other of the devices 72 or 73, the water passes through check valve 76 into the mixer 68, where it is homogeneously intermixed with the steam. The steam-water mixture is then delivered continuously through line 65 to the mixing device 61 where it is discharged with swirling action into the line 62.

Before commencing a run, a sufficient amount of lecithin is introduced into the tank 86. By the operation of pump 91, with valves 92, 97, 88, 89 closed, and valve 98 open, a measured amount of lecithin is delivered into the cylinder 87. Assuming that the rate with which it is desired to supply lecithin is known, pump 91 is adjusted to approximate the flow rate desired and then the pump is operated at this adjusted rate to withdraw the measured the measured amount of lecithin in cylinder 87 and to return the same back to the tank 86. This is accomplished by closing valves 98, opening valves 89 and 97, maintaining valves 92 and 88 closed. Assuming that this procedure has been applied one or more times to obtain a setting of pump 91 which is accurate to provide the feed rate desired, then valve 97 is closed, valves 89 and 98 maintained closed, and valves 92 and 93 opened for direct flow of the liquid lecithin from pump 91 into the mixing device 61. The lecithin is discharged from the end of a tube 63 within the mixing device, and particularly, within the tapered end portion of the same, where it is mixed with the steam-water to produce a homogenous fluid mixture suitable for application to the apparatus of FIGURE 1. From time to time, the line 62 may be opened to the atmosphere through line 101, as a check to determine if the material being delivered to the apparatus of FIGURE 1 is in proper condition, and to restore the apparatus to proper balance, if some temporary unbalanced condition exists by virtue of improper operation.

Our apparatus is adaptable to a wide variety of different operating conditions. The discrete material supplied to the apparatus may vary considerably with respect to such physical characteristics as moisture content, particle size, and bulk density. For example, the material may be relatively fine, dry powder, such as is obtained by commercial spray drying. Normally, such spray dried powders have a moisture content ranging from 1 to 4 percent. Particularly in instances where no intervening storage is required between spray drying and processing with our apparatus, then the spray drying operation can be adjusted to produce a powder containing substantial amounts of moisture, as for example from 5 to 18 percent, in which event the amount of fluid aggregate promoting medium used is adjusted accordingly. By way of example, anhydrous spray dried skim milk containing from 1 to 4 percent moisture can be treated with our apparatus, using a steam-water medium and with the conditions maintained whereby in the lower part of the treatment chamber 11 the resulting aggregates have a moisture content ranging from 10 to 16 percent. Thereafter, excess moisture is removed from the aggregates to produce a final product having a moisture content of the order of 2 to 3 percent. Assuming, however, that the spray drying operation for the skim milk is controlled to produce a discrete powdered material having a moisture content ranging from 6 to 12.5 percent, then the supply of steam-water to the apparatus of FIGURE 1 is adjusted accordingly and the conditions maintained within the chamber 11 are such that the aggregates in the lower part of this chamber have a total moisture content which may range from about 10 to 16.5 percent. In this instance, there is an increase in the moisture content within the treatment chambers of from 2 to 8 percent.

Our apparatus also has a wide range of adaptability with respect to the type of material being treated. Previous reference has been made to a number of dry powdered materials which can be treated with our apparatus. Generally, the purpose of processing such materials is to produce an instantized material in the form of discrete aggregates. However, in some instances, the primary purpose to be accomplished is to provide the material in the form of discrete aggregates, thus improving the handling characteristics and reducing the bulk density of the material, making it readily pourable and, therefore, capable of being marketed in containers of the pour spout type. With each material it is necessary to make proper adjustments both with respect to the fluid aggregate promoting medium employed and with respect to the ratio between solid particles and air volume delivered through the conduit 12, and the setting of the damper valve 14.

By way of example, in one particular instance the cyclone chamber 10 was about 108 inches in overall height, the cylindrical section 10a being about 54 inches long, and the conical section 10b about 54 inches long. Chamber 11 was about 12 feet in height, the cylindrical section 11a being about 72 inches long, and the conical section 11b about 72 inches long. The opening 17 was about 6 inches in diameter, and the lower discharge opening 36 about 15 inches in diameter. Assuming that the apparatus is to be used for the instantizing of milk solids, then the orifice of nozzle 25 can be varied in diameter in accordance with the particular kind of milk solids being treated. For skim milk solids, this orifice may be $11/32$ of an inch in diameter, and for fat containing milk solids, including whole milk powder, this orifice may be about $1/4$ of an inch in diameter. In the same instances, the total length of the orifice 26 including the divergent passage 27, was about $2 3/4$ inches and the divergent opening 27 at its largest end measured about $1 15/16$ inches in diameter. It will be understood that for other materials and under different operating conditions, the nozzle 25 should be modified in accordance with the fluid medium being discharged, and the amount of fluid medium being delivered to the treatment chamber. Also a wide variety of nozzles can be employed depending on the operating conditions and material being sprayed, as for example, simple orifice nozzles.

The ratio between the solids and the conveying airstream being delivered through the conduit 12 likewise is subject to adjustment in accordance with the material being handled, and the conditions under which the aggregating operation is being carried out. In general, it is desirable to operate the apparatus at maximum capacity for apparatus of a given size. By way of example, in typical instances, having reference particularly to dry milk powder, ambient air can be supplied to the cyclone chamber at a rate of about 3,000 cubic feet per minute, and the amount of entrained powder in this air can be of the order of 3,000 pounds per hour. Under such operating conditions, substantially all of the air delivered to the cyclone may be removed from the system through the exhaust conduit 13, the amount depending upon the setting of the damper valve 14.

In many instances the cyclone chamber 10 will effect a fair separation between the air discharging through the exhaust conduit 13 and the entrained solids. Where the powder is of such a character that a considerable carryover occurs in the air discharging through conduit 13, this discharging air can be passed through a second cyclone for the recovery of solids. The recovered solids can be returned to the feeder 34.

It will be evident from the foregoing that we have provided apparatus having wide adaptability for converting various materials into the form of discrete aggregates. In some instances a conversion to the form of discrete aggregates is primarily for the purpose of increasing wettability and dispersibility in water. In other instances, the purpose may be to convert a fine dry powder to the form of coarser discrete aggregates having reduced bulk density and good flow characteristics, and which can be more readily handled and packaged and dispensed from containers. For any desired aggregating operation, the apparatus can be readily adjusted for optimum operation, and when adjusted it maintains the desired optimum operating conditions.

We claim:

1. In apparatus for the conditioning of materials in the form of discrete powder particles to produce products in the form of discrete aggregates, a cyclone chamber, a supply conduit connected tangentially with the cyclone chamber and adapted to receive a stream of air with entrained powder particles, an exhaust conduit communicating with a central region of the cyclone chamber for exhausting an airstream from which powder particles have been separated, adjustable means for controlling the flow of air through said last named conduit whereby to regulate the proportion of said incoming stream to be exhausted thereby, a treatment chamber below the cyclone chamber, the treatment chamber having an upper substantially unobstructed opening communicating with the lower end of the cyclone chamber whereby powder from the cyclone and controlled amounts of air therefrom are delivered to the upper portion of the treatment chamber, and means disposed to discharge a fluid aggregate promoting medium into the treatment chamber whereby powder particles are conditioned to make their surfaces sticky and are brought into random contacts to form aggregates, the treatment chamber having a lower opening for the discharge of the aggregated product.

2. Apparatus as in claim 1 in which said last named means includes a nozzle disposed adjacent the central axis of the treatment chamber and also located centrally with respect to the inlet opening that establishes communication with the cyclone chamber and having a portion of the same within the cyclone chamber, a fluid supply pipe connected to the nozzle and jacketing means for said portion of the supply pipe to prevent direct contact of powder particles with the same.

3. Apparatus as in claim 2 together with a jacket surrounding a portion of the supply pipe located within the cyclone, together with an air supply pipe communicating with said jacket, the lower end of the jacket nearest the nozzle having openings for the discharge of air downwardly in a region surrounding the nozzle.

4. Apparatus as in claim 1 in which the lower opening of the treatment chamber is in communication with the atmosphere, and in which means is provided for removing air from the upper portion of the chamber, said last named means including a conduit in communication with the upper part of the treatment chamber.

References Cited

UNITED STATES PATENTS

| 2,893,871 | 7/1959 | Griffin | 99—234 |
| 3,085,492 | 4/1963 | Peebles | 99—234 |
| 3,251,291 | 5/1966 | Thompson et al. | 99—234 |

WALTER A. SCHEEL, *Primary Examiner.*

R. W. JENKINS, *Assistant Examiner.*